(12) United States Patent
Gerardiere

(10) Patent No.: US 8,058,978 B2
(45) Date of Patent: Nov. 15, 2011

(54) METHOD OF LOCATING THE POSITIONS OF WHEELS OF A VEHICLE

(75) Inventor: Olivier Gerardiere, Tournefeuille (FR)

(73) Assignee: Continental Automotive France, Toulouse (FR)

( * ) Notice: Subject to any disclaimer, the term of this patent is extended or adjusted under 35 U.S.C. 154(b) by 352 days.

(21) Appl. No.: 12/471,638

(22) Filed: May 26, 2009

(65) Prior Publication Data
US 2009/0295641 A1 Dec. 3, 2009

(30) Foreign Application Priority Data
May 27, 2008 (FR) ...................................... 08 02865

(51) Int. Cl.
*B60R 25/10* (2006.01)

(52) U.S. Cl. ...................... 340/426.3; 340/442; 340/445; 340/447; 73/146

(58) Field of Classification Search ............... 340/426.3, 340/438, 442, 443, 444, 445, 447, 686.1; 73/146, 146.4, 146.5, 146.8
See application file for complete search history.

(56) References Cited

U.S. PATENT DOCUMENTS

| | | | |
|---|---|---|---|
| 6,414,592 B1 * | 7/2002 | Dixit et al. | 340/447 |
| 6,441,728 B1 * | 8/2002 | Dixit et al. | 340/447 |
| 6,927,680 B2 * | 8/2005 | Kusunoki et al. | 340/442 |
| 7,683,766 B2 * | 3/2010 | Costes | 340/438 |
| 2004/0263404 A1 | 12/2004 | Voigtlaender et al. | |
| 2005/0190114 A1 | 9/2005 | Lin | |
| 2008/0224839 A1 | 9/2008 | Costes | |

FOREIGN PATENT DOCUMENTS

| FR | 2 889 595 | 2/2007 |
|---|---|---|
| JP | 10-302187 | 11/1998 |

OTHER PUBLICATIONS

French Search Report dated Dec. 1, 2008, from corresponding French application.

* cited by examiner

*Primary Examiner* — Toan N Pham

(74) *Attorney, Agent, or Firm* — Young & Thompson

(57) ABSTRACT

A method of locating the positions of wheels (2) of a vehicle (1) each fitted with an electronic module (3), whereby, in order to locate a wheel (2) on the one hand, the vehicle (1) is equipped with an electromagnetic emission source consisting of at least two emitting antennas (5, 6) positioned close to the wheel (2) and physically offset so that the emitting antennas present separate shadow areas along the trajectory of the electronic module (3) of the wheel and, on the other hand, a sequential switching of the emitting antennas (5, 6) is ordered.

14 Claims, 1 Drawing Sheet

METHOD OF LOCATING THE POSITIONS OF WHEELS OF A VEHICLE

Figure 1:
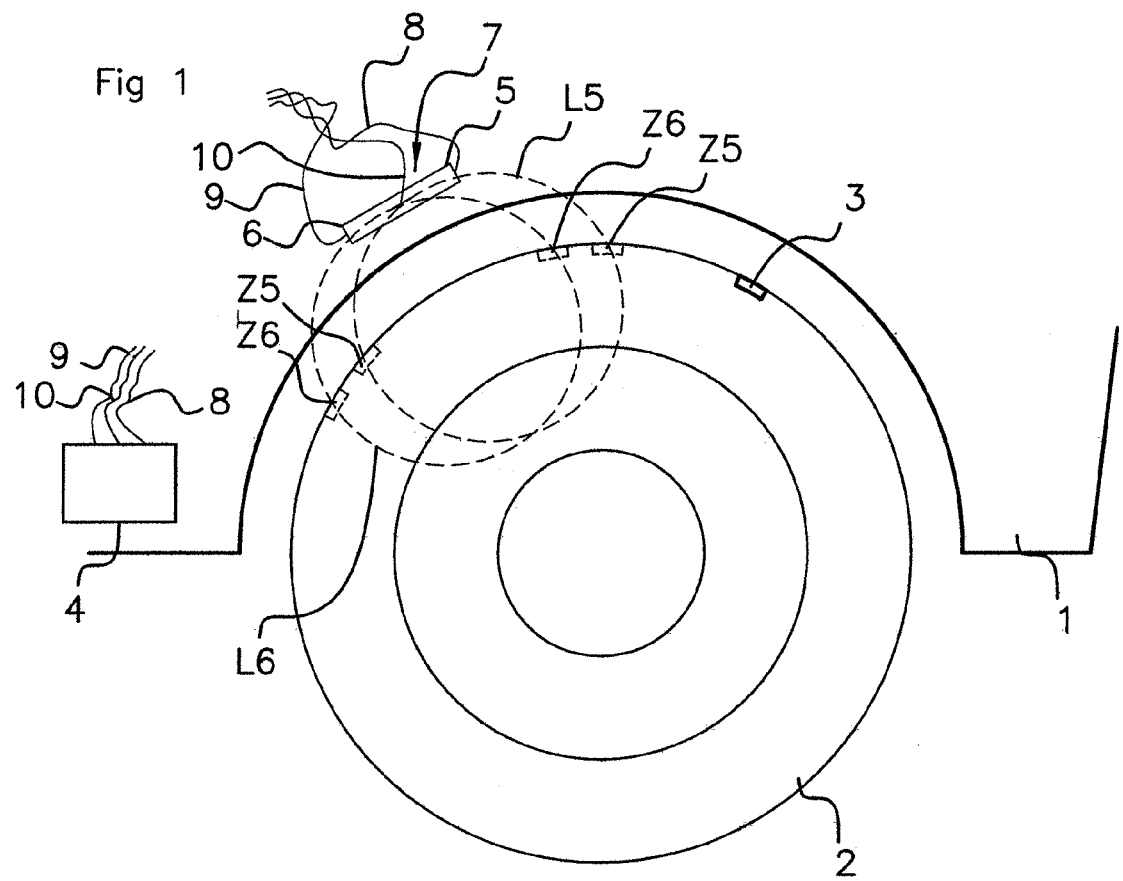

The invention relates to a method of locating the positions of wheels of a vehicle equipped with an electronic module adapted to emit, to a central processing unit mounted on the vehicle, signals representative of operating parameters of each wheel also including an identification code of the latter.

Motor vehicles are increasingly being provided, for safety purposes, with monitoring systems comprising sensors mounted on each of the wheels of the vehicle, dedicated to measuring parameters, such as pressure or temperature, of the tires fitted on these wheels, and intended to inform the driver of any abnormal variation of the measured parameter.

These monitoring systems are conventionally provided:
  with an electronic module mounted on each of the wheels of the vehicle, incorporating, in addition to the abovementioned sensors, a microprocessor and a radiofrequency emitter (or RF emitter), and
  a central processing unit for receiving the signals emitted by the emitters, comprising a computer incorporating a radiofrequency receiver (or RF receiver) connected to an antenna.

One of the problems that such monitoring systems have to solve lies in the need to have to associate with each signal received by the receiver of the central processing unit an indication regarding the location of the electronic module and therefore of the wheel originating this signal, this obligation remaining throughout the life of the vehicle, in other words, having to be observed even after wheel changes or even simply wheel position reversals.

To this end, one current locating method consists in using three emitting antennas each positioned close to one of the wheels of the vehicle, and carrying out a locating procedure consisting in successively exciting each of these three emitting antennas.

According to this procedure, the electronic module mounted on the wheels situated close to the excited emitting antenna emits, in response and to the central processing unit, a signal including an identification code of said module, so that the successive excitation of the three antennas leads to the location of the three electronic modules mounted on the wheels next to these antennas and, by deduction, to the location of the fourth module.

The main advantage of such a method lies in the fact that the locating procedure is very rapid and leads to an almost instantaneous locating after the vehicle has started up.

However, one of the problems encountered in this locating procedure lies in the existence of shadow areas that correspond, for given positions of each electronic module in relation to the emitting antenna, to areas of non-reception by said electronic module of the electromagnetic signals emitted by said emitting antenna.

In practice, the presence of such non-reception areas actually affects the transmission of the data to the electronic modules because:
  while the vehicle is moving, these non-reception areas regularly appear on each wheel revolution,
  in the stopped state of the vehicle, these reception areas can lead to a total absence of reception of the data transmitted by the emitting antennas, if, by chance, the electronic module of the wheel is in a shadow area.

Such a non-reception area phenomenon can therefore considerably affect the vehicle wheel locating procedure.

Already known from document US 2004/0263404 is to multiply the number of antennas placed on the wheel rim of the vehicle to ensure that the reception antenna (placed on the body of the vehicle in the vicinity of the wheel) always receives at least one of the messages emitted by the plurality of emitting antennas placed on the rim. However, such a solution requires numerous antennas to be placed on the wheel rim inside the tire, which is not only costly, but also is complex because the inside of the tire is an area that must remain airtight.

The present invention aims to overcome the abovementioned drawbacks relating to the problems of non-reception by an electronic module mounted on a wheel of a vehicle, of the electromagnetic signals emitted by an emitting antenna positioned close to the wheel, and its main objective is to provide a method leading to an elimination of the drawbacks associated with the existence of the areas of non-reception by the electronic modules of said electromagnetic signals.

To this end, the invention targets a method of locating the positions of wheels of a vehicle each equipped with an electronic module adapted to transmit, to a central processing unit mounted on the vehicle, signals representative of operating parameters of each wheel also including an identification code of the latter, said locating method consisting in:
  equipping the vehicle with electromagnetic emission sources each positioned close to a wheel, and adapted to present a coverage encompassing the trajectory of the electronic module when the wheel rotates,
  and programming the central processing unit and the electronic modules so as to apply a locating procedure whereby, in succession for each of the electromagnetic emission sources, the central processing unit orders the emission, by said electromagnetic emission source, of an electromagnetic identification request signal, on receipt of which the electronic module of each wheel positioned close to this electromagnetic emission source is adapted to send in response a signal comprising at least the identification code of that wheel.

According to the invention, this locating method is characterized in that:
  the vehicle is equipped with electromagnetic emission sources each consisting of at least two emitting antennas physically offset so that said emitting antennas present separate shadow areas along the trajectory of the electronic module of the wheel positioned close by,
  and a sequential switching of the emitting antennas of each electromagnetic emission source is ordered.

According to the inventive method, each electromagnetic emission source positioned close to a wheel in order to apply a locating procedure therefore consists of two "complementary" emitting antennas positioned and connected so that the areas of non-reception, by the electronic module mounted on the wheel, of the electromagnetic signals emitted by said emitting antennas:
  present a very low probability of potential of appearance when the vehicle is moving, notably less than the frequency of the systematic appearances that occur with the current locating techniques,
  do not in any way affect the possibilities of reception of the data transmitted by the emitting antennas, in the stopped state of the vehicle.

Because of this, in practice, the two emitting antennas have to behave substantially like a single emitting antenna presenting no shadow areas along the trajectory of the electronic module of the wheel positioned close by.

According to one advantageous embodiment aiming in particular to minimize the costs of connecting the emitting antennas (wiring, etc.), electromagnetic emission sources are used that each consist of two emitting antennas connected so as to form two dipoles including a common pole.

As an advantageous embodiment, each electromagnetic emission source can thus be produced by means of a single ferrite stick.

Moreover, in the interests of simplicity of implementation, electromagnetic emission sources are advantageously used that each consist of two emitting antennas aligned along a common axis.

Furthermore, the two emitting antennas are advantageously arranged so that their common axis extends orthogonally relative to a radial axis of the wheel situated close by.

Moreover, advantageously according to the invention, a sequential switching of the emitting antennas is ordered with a switching frequency of the order of 1 kHz.

Figure 2:
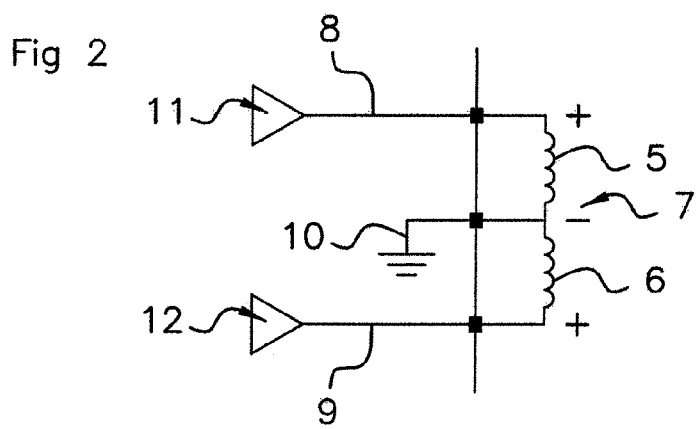
Figure 3:
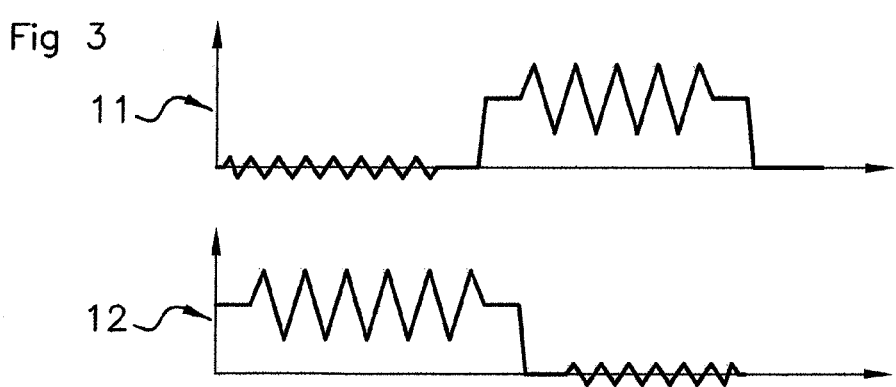

Other features, aims and benefits of the invention will become apparent from the detailed description that follows, with reference to the appended drawings which represent, as a non-limiting example, a preferred embodiment thereof. In these drawings:

FIG. 1 is a schematic lateral view of a wheel of a vehicle equipped with a locating device according to the invention, FIG. 2 is a simplified electrical diagram of the control circuit of two emitting antennas connected in accordance with the invention, and FIG. 3 is a graph representing an emission cycle of these two emitting antennas.

The locating device according to the invention represented by way of example in FIG. 1 is intended to locate the position of a wheel 2 of a vehicle 1.

This locating device is more specifically intended to be installed on vehicles 1 provided with a monitoring system conventionally comprising, firstly, associated with each wheel 2, an electronic module 3, for example attached to the rim of said wheel, so as to be positioned inside the jacket of the tire.

Each of these electronic modules 3 incorporates for example a sensor dedicated to measuring parameters, such as pressure and/or temperature of the tire, connected to a microprocessor having an identification code of said sensor, linked to an RF emitter connected to a low frequency antenna.

The monitoring system also comprises a centralized computer or central processor unit 4 including a microprocessor and incorporating an RF receiver able to receive the signals emitted by each of the electronic modules 3.

Usually, such a monitoring system, and in particular its central processor unit 4, is designed to inform the driver of any abnormal variation of the parameters measured by the sensors associated with the wheels 2.

When associated with the monitoring system described above, the function of the locating device according to the invention is to make it possible to associate with each signal received by the central processing unit 4 an indication concerning the location of the electronic module 3 originating this signal.

To this end, for, for example, a vehicle 1 with four wheels 2, the locating device is conventionally fitted on three of the four wheels 2 of the vehicle 1, and comprises, for each of said wheels, an electromagnetic emission source 5, 6 positioned in the wheel arch and adapted to present a coverage encompassing the trajectory of the electronic module 3 when the wheel 2 rotates.

Furthermore, the central processing unit 4 and the electronic modules 3 are programmed so as to apply a locating procedure whereby the central processing unit 4 successively orders the emission, by each electromagnetic emission source, of an electromagnetic identification request signal, on receipt of which the electronic module 3 of the wheel 2, positioned close by, is adapted to emit in response a signal including the identification code of that wheel.

Usually, furthermore, the location of the fourth wheel is obtained by deduction, once the first three wheels have been located.

According to the invention, each electromagnetic emission source consists of two emitting antennas 5, 6 produced using a single ferrite stick 7 linked to the central processing unit 4 by cables 8-10 connected in such a way as to form two dipoles 5, 6 including a common pole.

Furthermore, the ferrite stick 7 is positioned so that its longitudinal axis extends orthogonally relative to the radial axis of the wheel 2 cutting the common pole of the two emitting antennas 5, 6.

As illustrated in FIG. 1 which represents one of the field lines L5-L6 of each of the two emitting antennas 5, 6 positioned in this way, the stick 7 forms two emitting antennas 5, 6 presenting separate shadow areas Z5, Z6 along the trajectory of the electronic module 3 mounted on the wheel 2.

Furthermore, as represented in FIG. 2, the two emitting antennas 5, 6 are electrically connected so that:

their common pole (negative pole in the example) is linked to ground by a cable 10, their second pole (positive pole in the example) is linked to a control circuit (or "driver") 11, respectively 12, by a cable 8, respectively 9.

As represented in FIG. 3, such a connection makes it possible, in accordance with the inventive method, to order a sequential switching of the emitting antennas 5, 6.

Such a sequential order associated with the fact that the emitting antennas 5, 6 present separate shadow areas along the trajectory of the electronic module 3 of the neighboring wheel 2, leads to the production of an electromagnetic emission source behaving substantially like a single emitting antenna presenting no shadow areas along the trajectory of the electronic module 3. In practice, the sequential ordering of each of the antennas makes it possible to switch over from one of the antennas to the other regularly within a very short time period, so that, if one of the antennas is in a shadow area, the other is not.

The invention claimed is:

1. Method of locating positions of wheels (2) of a vehicle (1) each equipped with an electronic module (3) adapted to transmit, to a central processing unit (4) mounted on the vehicle (1), signals representative of operating parameters of each wheel also including an identification code of said wheel, said locating method consisting in:

equipping the vehicle (1) with electromagnetic emission sources (5, 6) each positioned close to a wheel (2), and adapted to present a coverage encompassing trajectory of the electronic module (3) when the wheel (2) rotates, and programming the central processing unit (4) and the electronic modules (3) so as to apply a locating procedure whereby, in succession for each of the electromagnetic emission sources (5, 6), the central processing unit (4) orders the emission, by said electromagnetic emission source, of an electromagnetic identification request signal, on receipt of which the electronic module (3) of each wheel (2) positioned close to this electromagnetic emission source (5, 6) is adapted to send in response a signal comprising at least the identification code of that wheel, and said locating method being characterized in that:

the vehicle (1) is equipped with electromagnetic emission sources each consisting of at least two emitting antennas (5, 6) physically offset so that said emitting antennas present separate shadow areas along the trajectory of the electronic module (3) of the wheel (2) positioned close by, and a sequential switching of the emitting antennas (5, 6) is ordered in order to switch over from one of the antennas to the other so that, if one of the antennas is in a shadow area, the other is not.

2. The locating method according to claim 1, characterized in that electromagnetic emission sources are used that each consist of two emitting antennas (5, 6) connected so as to form two dipoles comprising a common pole.

3. The locating method according to claim 2, characterized in that each electromagnetic emission source is produced by means of a single ferrite stick (7).

4. The locating method according to claim 3, characterized in that a sequential switching of the emitting antennas (5, 6) is ordered with a switching frequency of the order of 1 kHz.

5. The locating method according to claim 2, characterized in that electromagnetic emission sources are used that each consist of two emitting antennas (5, 6) aligned along a common axis.

6. The locating method according to claim 5, characterized in that the two emitting antennas (5, 6) forming electromagnetic emission source are arranged so that their common axis extends orthogonally relative to a radial axis of the wheel (2) situated close by.

7. The locating method according to claim 2, characterized in that a sequential switching of the emitting antennas (5, 6) is ordered with a switching frequency of an order of 1 kHz.

8. The locating method according to claim 1, characterized in that electromagnetic emission sources are used that each consist of two emitting antennas (5, 6) aligned along a common axis.

9. The locating method according to claim 8, characterized in that the two emitting antennas (5, 6) forming an electromagnetic emission source are arranged so that their common axis extends orthogonally relative to a radial axis of the wheel (2) situated close by.

10. The locating method according to claim 9, characterized in that each electromagnetic emission source is produced by means of a single ferrite stick (7).

11. The locating method according to claim 9, characterized in that a sequential switching of the emitting antennas (5, 6) is ordered with a switching frequency of the order of 1 kHz.

12. The locating method according to claim 8, characterized in that each electromagnetic emission source is produced by means of a single ferrite stick (7).

13. The locating method according to claim 8, characterized in that a sequential switching of the emitting antennas (5, 6) is ordered with a switching frequency of the order of 1 kHz.

14. The locating method according to claim 1, characterized in that a sequential switching of the emitting antennas (5, 6) is ordered with a switching frequency of the order of 1 kHz.

* * * * *